(12) United States Patent
Li

(10) Patent No.: US 10,529,362 B2
(45) Date of Patent: Jan. 7, 2020

(54) MAGNETIC STRUCTURE FOR ERASING MEDIA HAVING HIGH MAGNETIC COERCIVITY

(71) Applicant: Dexter Magnetic Technologies, Inc., Elk Grove Village, IL (US)

(72) Inventor: Chun Li, Naperville, IL (US)

(73) Assignee: Dexter Magnetic Technologies, Inc., Elk Grove Village, IL (US)

( * ) Notice: Subject to any disclaimer, the term of this patent is extended or adjusted under 35 U.S.C. 154(b) by 0 days.

(21) Appl. No.: 16/269,864

(22) Filed: Feb. 7, 2019

(65) Prior Publication Data

US 2019/0272847 A1 Sep. 5, 2019

Related U.S. Application Data

(60) Provisional application No. 62/638,323, filed on Mar. 5, 2018.

(51) Int. Cl.

| *G11B 5/012* | (2006.01) |
|---|---|
| *G11B 5/00* | (2006.01) |
| *G11B 5/03* | (2006.01) |
| *H01F 13/00* | (2006.01) |
| *G11B 5/024* | (2006.01) |
| *G11B 20/10* | (2006.01) |

(52) U.S. Cl.
CPC .............. *G11B 5/012* (2013.01); *G11B 5/024* (2013.01); *G11B 5/0245* (2013.01); *G11B 5/03* (2013.01); *G11B 2005/0018* (2013.01); *G11B 2005/0021* (2013.01); *G11B 2020/10851* (2013.01); *H01F 13/006* (2013.01)

(58) Field of Classification Search
None
See application file for complete search history.

(56) References Cited

U.S. PATENT DOCUMENTS

| 5,544,132 | A | * | 8/1996 | Furlani | ............... | G11B 11/1056 |
| | | | | | | 360/59 |
| 5,909,411 | A | * | 6/1999 | Furlani | ............... | G11B 11/1056 |
| | | | | | | 360/59 |
| 7,164,569 | B1 | * | 1/2007 | Thiel | ..................... | G11B 5/0245 |
| | | | | | | 361/143 |
| 7,369,337 | B2 | * | 5/2008 | Fujisawa | ................ | G11B 5/865 |
| | | | | | | 360/15 |
| 7,561,378 | B2 | * | 7/2009 | Kadowaki | .............. | G11B 5/024 |
| | | | | | | 360/118 |
| 7,652,837 | B2 | * | 1/2010 | Kitamura | ............... | G11B 5/012 |
| | | | | | | 360/66 |

(Continued)

*Primary Examiner* — Tan X Dinh
(74) *Attorney, Agent, or Firm* — Richard A. Fagin

(57) ABSTRACT

A magnet structure for a magnetic data storage medium erasing apparatus includes a first half comprising a first plurality of magnets arranged symmetrically, having polarization direction of adjacent magnets in quadrature and at an oblique angle with respect to a plane of symmetry. A second half comprises a second plurality of magnets arranged symmetrically, having polarization direction of adjacent magnets in quadrature and at an oblique angle with respect to the plane of symmetry. The second half is arranged symmetrically with respect to the first half, wherein the first half and the second half are separated by an air gap disposed about the plane of symmetry.

6 Claims, 3 Drawing Sheets

(56) References Cited

U.S. PATENT DOCUMENTS

| | | | |
|---|---|---|---|
| 8,208,211 B2* | 6/2012 | Kikuchi | B82Y 10/00 360/15 |
| 8,339,724 B2* | 12/2012 | Huang | H01F 13/006 360/66 |
| 8,520,333 B2* | 8/2013 | Li | G11B 5/0245 360/66 |
| 9,361,909 B2* | 6/2016 | McLaurin | G11B 5/012 |
| 2001/0043420 A1* | 11/2001 | Serizawa | G11B 5/0245 360/57 |
| 2002/0101684 A1* | 8/2002 | Saito | G11B 5/00 360/55 |
| 2008/0100942 A1* | 5/2008 | Meier | B82Y 25/00 360/31 |

* cited by examiner

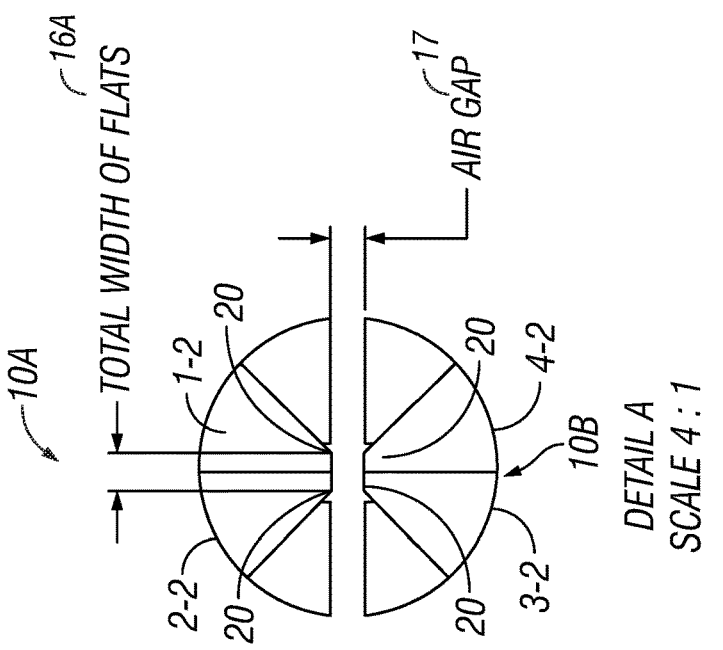
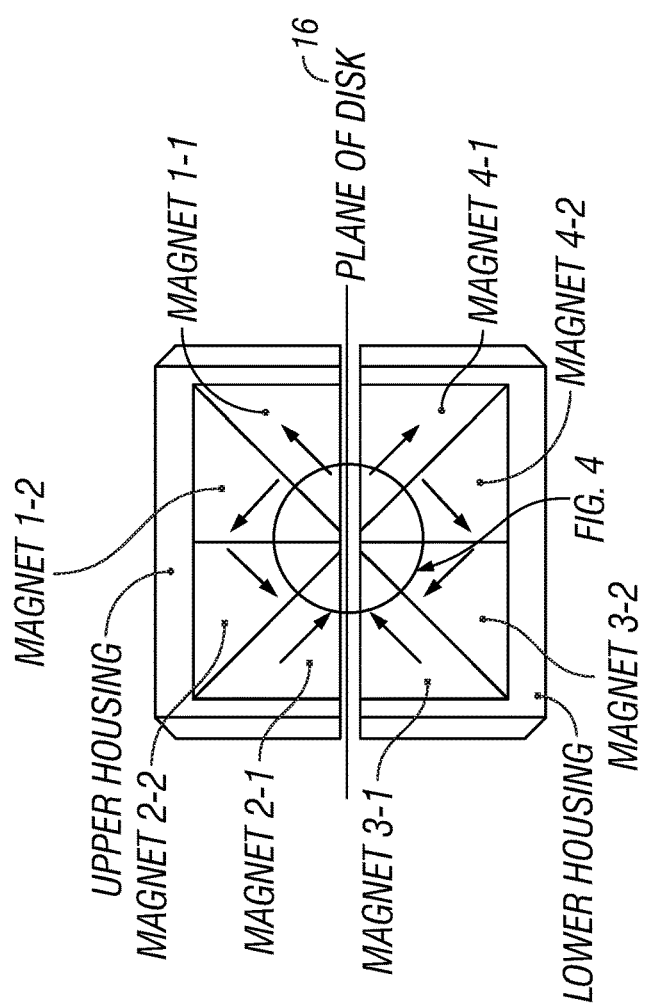
FIG. 4
FIG. 3

MAGNETIC STRUCTURE FOR ERASING MEDIA HAVING HIGH MAGNETIC COERCIVITY

CROSS REFERENCE TO RELATED APPLICATIONS

Priority is claimed from U.S. Provisional Application No. 62/638,323 filed on Mar. 5, 2018 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of magnetic data storage media. More specifically, the disclosure relates to structures for devices used to erase magnetic data storage media.

The advent of heat-assisted magnetic recording technology ("HAMR") may enable increasing the amount of data that can be stored on a magnetic medium such as a disk. The potential increase of data storage density may be up to 100 times the storage density of conventional magnetic data storage media. The magnetic coercivity of HAMR media can be 5 Tesla or more. Such high coercivity makes erasing HAMR media much more difficult than conventional magnetic data storage media. Even with the heat activation, erasing of HAMR data storage media may require in-plane magnetic field amplitudes of 1.5-2.0 Tesla or more.

SUMMARY

According to one aspect, the disclosure relates to a magnet structure for a magnetic data storage medium erasing apparatus that includes a first half comprising a first plurality of magnets arranged symmetrically, having polarization direction of adjacent magnets in quadrature and at an oblique angle with respect to a plane of symmetry. A second half comprises a second plurality of magnets arranged symmetrically, having polarization direction of adjacent magnets in quadrature and at an oblique angle with respect to the plane of symmetry. The second half is arranged symmetrically with respect to the first half, wherein the first half and the second half are separated by an air gap disposed about the plane of symmetry.

In some embodiments, each of the first half and the second half are enclosed in a respective housing. In some embodiments, each respective housing comprises a ferromagnetic material.

In some embodiments, the first and second plurality of magnets comprise a quadrature magnet material.

In some embodiments, the oblique angle is 45 degrees with respect to the plane of symmetry.

Some embodiments further comprise a truncated corner on at least some of the magnets in the first half and the second half, the truncated corners oriented toward the plane of symmetry.

Other aspects and advantages will be apparent from the description and claims following.

BRIEF DESCRIPTION OF THE DRAWINGS

FIG. 3 shows a side view as in FIG. 1 to illustrate the location of a detailed view of one embodiment of a magnetic structure for an apparatus according to the present disclosure.

FIG. 4 shows details of the magnetic structure illustrated in FIG. 3.

DETAILED DESCRIPTION

Figure 1:
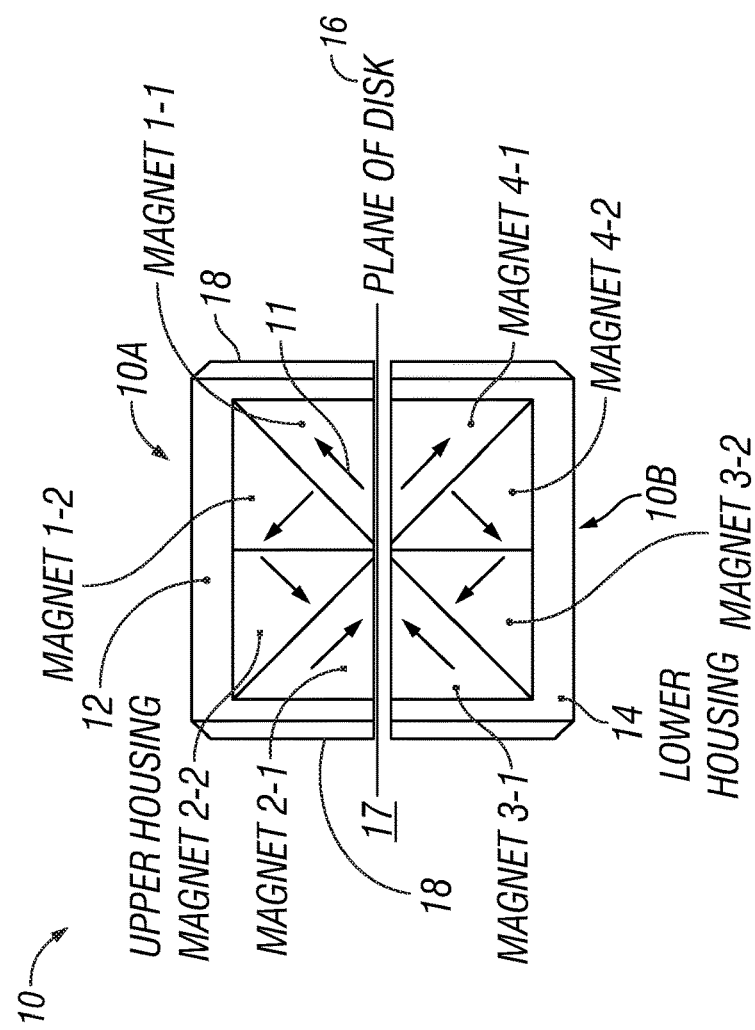
FIG. 1 shows a side view of one embodiment of a magnetic data storage medium erasing apparatus according to the present disclosure.

FIG. 1 shows an end view of an example embodiment of a magnetic storage medium erasing apparatus 10 having a magnetic structure according to the present disclosure. In the embodiment shown in FIG. 1, two halves of the apparatus 10, a first half 10A and a second half 10B may be symmetrical with respect to a plane of symmetry 16. The plane of symmetry 16 may be disposed in an air gap 17 having a selected thickness and disposed between the first half 10A and the second half 10B.

Each of the first half 10A and the second half 10B may comprise magnets oriented such that their respective polarization directions are in quadrature between adjacent magnets, at an oblique angle with respect to the air gap 17 and symmetrically with respect to the air gap 17. The present example embodiment of the apparatus 10 can be understood conceptually as a 4-quadrant structure with quadrants 1 and 2 comprising the first half 10A and quadrants 3 and 4 comprising the second half 10B of the apparatus 10. Each quadrant may divided into two symmetric, triangular sections.

The magnetic polarization orientation of a magnet 1-1 (in the first section in first quadrant), which may be a permanent magnet, is 45° from the plane of symmetry 16 and the North Pole (indicated by the arrowhead on each magnet) may be away from the air gap 17. For such magnet and other magnets in each of the first half 10A and the second half 10B, polarization direction is indicated, as stated above) by an arrow on the face of each magnet. Another magnet 1-2 (in the second section in the first quadrant) may be oriented such that its polarization direction is rotated 90° counter clockwise (CCW) with respect to the polarization direction of magnet 1-1. Further magnet 2-2 (in the second section in the second quadrant) may be oriented such that its polarization direction is rotated 90° CCW from that of magnet 1-2. A still further magnet magnet 2-1 (in the first section in the second quadrant) may be oriented such that its polarization direction is rotated 90° CCW from that of magnet 2-2 with North Pole oriented toward the plane of symmetry 16.

Figure 2:
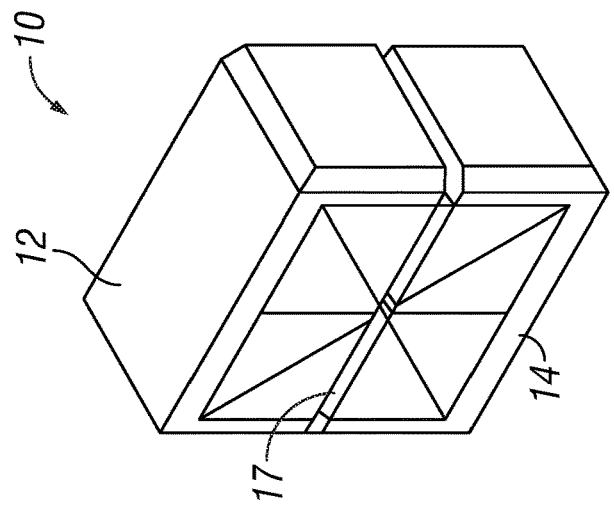
FIG. 2 shows an oblique view of the embodiment shown in FIG. 1.

Magnets 3-1, 3-2, 4-1 and 4-2 disposed in the second half 10B may be arranged symmetrically and arranged as a mirror image of the arrangement of the magnets in first half 10A as explained above. A first housing 12 and a corresponding second housing 14 may be made from ferromagnetic material to enhance the magnetic field in the plane of symmetry 16 and provide magnetic shielding for adjacent areas outside the apparatus 10. The first housing 12 and the second housing 14 may be enclosed on respective sides by any suitable enclosure material 18 to repel dirt and moisture. FIG. 2 shows an oblique view of the example embodiment shown in FIG. 1.

The above described magnets, 1-1-, 1-2, 2-1, 2,2, 3-1, 3-2, 4-1 and 4-2 may be made from suitable quadrature magnet material to reduce demagnetization resulting from adjacent magnets being in quadrature orientation to each other.

FIG. 3 shows a view similar to that of FIG. 1 in order to illustrate location in a detailed view of an example embodiment of certain ones of the magnets. The example embodiment is shown in more detail in FIG. 4.

In the embodiment shown in FIG. 4, magnet 1-2 and magnet 2-2 may have a truncated corner 20 on the corner oriented toward the air gap 17. A "truncated corner" may be understood with reference to the structure of each magnet described with reference to FIG. 1, namely, each corner being one corner of a triangularly shaped magnet. A corresponding and symmetric structure may be used on magnets 3-2 and 4-2 in the lower half 10B. The combined width 16A of the two truncated corners 20 in the upper half 10A, and correspondingly in the lower half 10B may be the same as thickness of the air gap 17. The truncated corners provide a feature to enhance the magnetic field in the air gap 17 as contrasted with the triangular magnets shown in FIG. 1.

Figure 5:
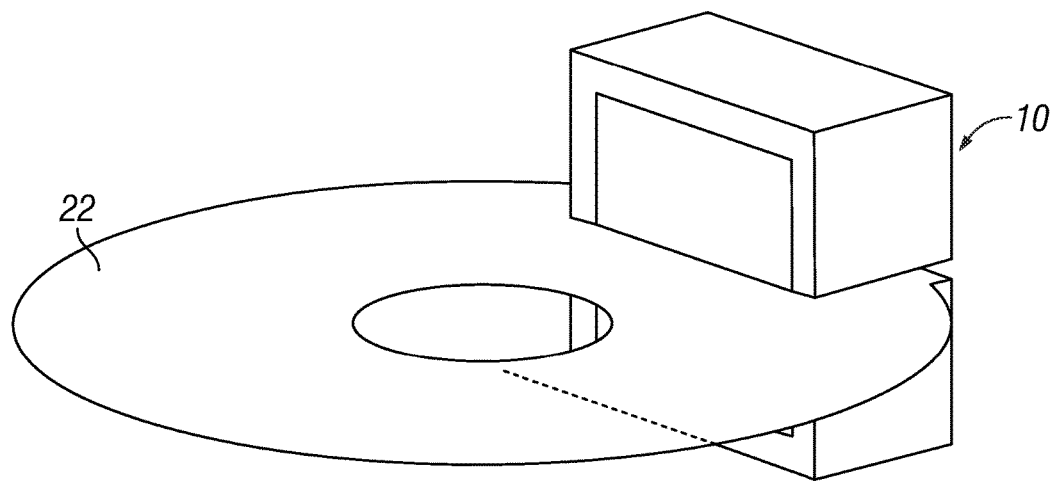
FIG. 5 shows an example embodiment of an apparatus according to the present disclosure used to erase a magnetic data storage disk.

FIG. 5 illustrates a magnetic data storage medium in the form of a disk 22 partially inserted into the apparatus 10 to show the use of the apparatus 10 to erase the magnetic storage medium.

Figure 6:
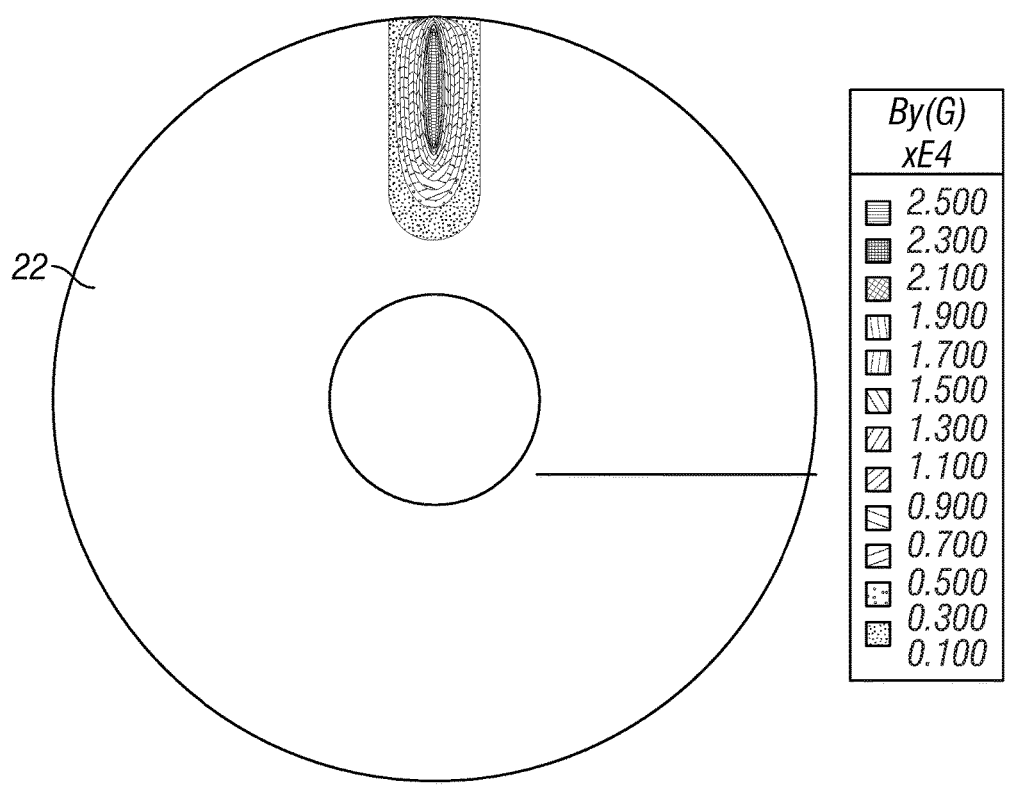
FIG. 6 shows distribution of magnetic field amplitude in the plane of a disk in the apparatus as shown in FIG. 5.

FIG. 6 illustrates the in-plane magnetic field of one embodiment of the invention. The peak magnetic field amplitude exceeds 2 Tesla in this embodiment.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A magnet structure for a magnetic data storage medium erasing apparatus, comprising:
    a first half comprising a first plurality of magnets arranged symmetrically, having polarization direction of adjacent magnets in quadrature and at an oblique angle with respect to a plane of symmetry; and
    a second half comprising a second plurality of magnets arranged symmetrically, having polarization direction of adjacent magnets in quadrature and at an oblique angle with respect to the plane of symmetry, the second half and symmetrically with respect to the first half, the first half and the second half separated by an air gap disposed about the plane of symmetry.

2. The magnet structure of claim 1 wherein each of the first half and the second half are enclosed in a respective housing.

3. The magnet structure of claim 2 wherein each respective housing comprises a ferromagnetic material.

4. The magnet structure of claim 1 wherein the first and second plurality of magnets comprise a quadrature magnet material.

5. The magnet structure of claim 1 wherein the oblique angle is 45 degrees with respect to the plane of symmetry.

6. The magnet structure of claim 1 further comprising a truncated corner on at least some of the magnets in the first half and the second half, the truncated corners oriented toward the plane of symmetry.

* * * * *